Nov. 4, 1947.  W. H. FRANK  2,430,119
WIRE TERMINAL TURNING AND BINDING TOOL
Filed Dec. 6, 1943
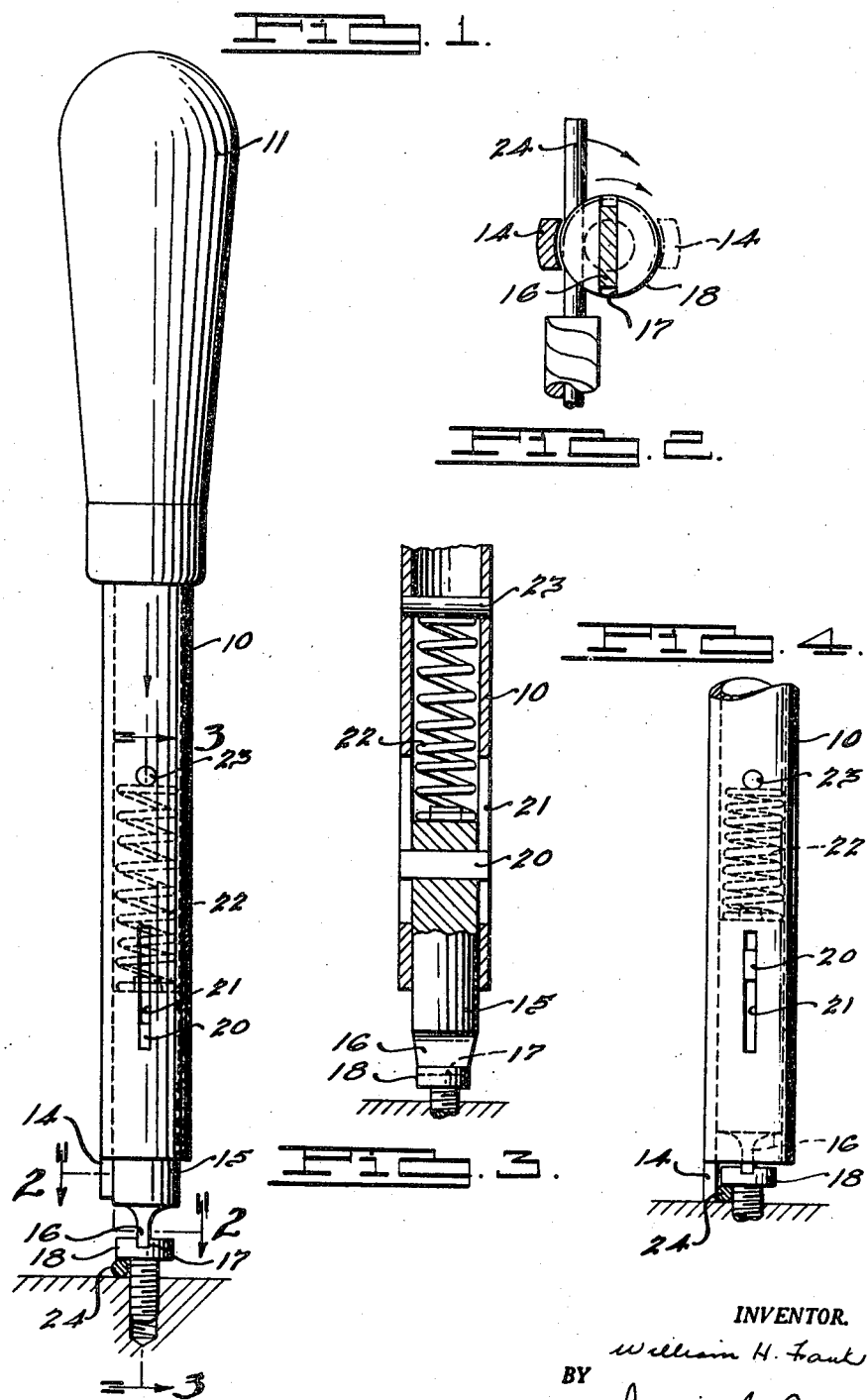
INVENTOR.
William H. Frank
BY
Daniel G. Cullen.
ATTORNEY.

Patented Nov. 4, 1947

2,430,119

UNITED STATES PATENT OFFICE 2,430,119

WIRE TERMINAL TURNING AND BINDING TOOL

William H. Frank, Detroit, Mich., assignor to Bull-Dog Electric Products Company, Detroit, Mich., a corporation of West Virginia Application December 6, 1943, Serial No. 513,146

1 Claim. (Cl. 140—124)

This application relates to tools for looping and binding wire in place under screw heads or the like.

The tool hereof is disclosed in the appended drawings.

In these drawings,

Fig. 1 is a longitudinal view.

Figs. 2 and 3 are section views on lines 2—2 and 3—3, respectively, of Fig. 1.

Fig. 4 is a view like Fig. 1, but showing the tool in position for looping wire under a screw head.

The tool hereof is used to loop wire under screw heads and then to tighten down the screw heads and thus clamp the looped wires in place.

The tool comprises a tube 10 having one end formed as a hand grip 11. The open or operative end of the tube is formed with a longitudinally extending wire looping lug 14. Slidably mounted within the tube at the operative end is an element 15 shown as a blade, having a longitudinally projecting tang 16 adapted to fit within the slot 17 of a screw head 18 for turning it and tightening it down.

The element 15 is formed with lateral wings 20 disposed within long slots 21 of the tube, the slots and wings providing stop and guide ways to permit the element to slide longitudinally in the tube to a limited extent.

A coiled compression spring 22 is disposed within the tube, one end abutting the end of the blade or element and the other end abutting an abutment 23 in the form of a pin fixed within the tube. The spring constantly biases the element outwardly so that the normal position of the tang 16 is beyond the end of the tube and beyond the wire looping lug.

The tang 16 and the lug 14 are so positioned relatively in a lateral direction that when the tang is fitted within the slot of a screw head, the lug is laterally outside of the screw head so as to engage a wire 24 for looping it when the hand grip is pushed down and turned.

The tool hereof may be manipulated with one hand to loop a wire around the shank of the screw and also to tighten down the screw head thereafter. When used for this purpose, the tool is applied to a screw head under which has already been positioned a wire and the hand grip is then pushed down so that the lug 14 moves down along the screw head until it is in position to engage the wire. Then the hand grip is turned so that the lug 14 loops the wire around the screw shank, and during this operation, the tang is seated within the slot of the screw, and the tool is journaled by the screw with respect to the surface into which the screw shank is threaded. This will involve a partial turn of the screw because the tang will, of course, turn with the tube. After the wire has been looped around the shank, the downward push on the hand grip is relaxed enough to permit the lug 14 to rise and clear the wire and then the tool is used as an ordinary screw tightener to tighten the screw down onto the wire.

By virtue of the fact that the blade is slidable with respect to the hand grip, and the wire looping lug 14 is fixed with respect to the hand grip, the tool thereof may be primarily regarded as a wire looping device resiliently mounting a screw turning blade, and should be viewed as such.

Now having described the tool herein disclosed, reference should be had to the claim which follows.

I claim:

A tool for looping a wire around the shank of and under the head of a fastening screw or the like and for turning the screw to clamp the loop under its head and against a surface, comprising a tube having one end formed with a hand grip and the other end formed with a longitudinally extending wire looping lug, an element slidably mounted within the tube and formed with an end projecting longitudinally from the lug end of the tube to engage the fastening screw head for turning it, the element and the tube being formed with stop and guide ways whereby the element slides longitudinally in the tube, a spring within the tube normally biasing the element to its outermost position, the relative lateral positions of the element and the lug being such that when the element engages a fastening screw head to rotate it, the lug is laterally outside of said head.

WILLIAM H. FRANK.

REFERENCES CITED

The following references are of record in the file of this patent:

UNITED STATES PATENTS

| Number | Name | Date |
|---|---|---|
| 1,952,395 | Tillyer et al. | Mar. 27, 1934 |
| 2,227,627 | Bruzon | Jan. 7, 1941 |
| 701,941 | Rowlands | June 10, 1902 |
| 1,708,766 | Lochner | Apr. 9, 1929 |
| 774,112 | Rundquist | Nov. 1, 1904 |
| 1,394,089 | Herman | Oct. 18, 1941 |
| 789,941 | Sibley | May 16, 1905 |